US012654371B2

(12) United States Patent
Livk et al.

(10) Patent No.: US 12,654,371 B2
(45) Date of Patent: Jun. 16, 2026

(54) METHOD OF MANUFACTURING A CHARGING DEVICE WITH A CONTACT HOUSING OF AN ELECTRICALLY POWERED VEHICLE

(71) Applicant: Lisa Dräxlmaier GmbH, Vilsbiburg (DE)

(72) Inventors: Uros Livk, Garching (DE); Peter Esterbauer, Ranshofen (AT); Arvid Kim, Pleiskirchen (DE); Rupert Feischl, Großgmain (AT); Manuel Leitner, Braunau (AT)

(73) Assignee: Lisa Draexlmaier GmbH, Vilsbiburg (DE)

( * ) Notice: Subject to any disclaimer, the term of this patent is extended or adjusted under 35 U.S.C. 154(b) by 925 days.

(21) Appl. No.: 17/721,494

(22) Filed: Apr. 15, 2022

(65) Prior Publication Data

US 2022/0332027 A1 Oct. 20, 2022

(30) Foreign Application Priority Data

Apr. 15, 2021 (DE) .......................... 102021109460.7

(51) Int. Cl.
*H01M 10/46* (2006.01)
*B29C 45/16* (2006.01)
*B29L 31/34* (2006.01)

(52) U.S. Cl.
CPC ........ *B29C 45/1671* (2013.01); *B29C 45/164* (2013.01); *H01M 10/46* (2013.01); *B29L 2031/34* (2013.01); *H01M 2220/20* (2013.01)

(58) Field of Classification Search
CPC .................................................. H01M 10/46

USPC .......................................................... 320/111
See application file for complete search history.

(56) References Cited

U.S. PATENT DOCUMENTS 3,444,618 A * 5/1969 Sorlie .................... H01R 43/24
                                                          29/598
2006/0061010 A1* 3/2006 Huonker ............. B29C 45/1671
                                                        264/272.11

FOREIGN PATENT DOCUMENTS

DE      102004044614 A1      6/2006
DE      102018133100      *    6/2020
DE      102018133100 A1      6/2020

OTHER PUBLICATIONS

Office Action for DE 102021109460.7 from the German Patent Office (in German).

(Continued)

*Primary Examiner* — Nathaniel R Pelton
(74) *Attorney, Agent, or Firm* — BelayIP

(57) ABSTRACT

A method of manufacturing a charging device with a contact housing of an electrically powered vehicle including the steps of providing at least one electrical contact element having a contact area, the electrical contact element being electrically contactable with a corresponding contact element in said contact area; inserting the electrical contact element into an injection mold; and closing the injection mold and forming a cavity around the electrical contact element within the injection mold. Finally, an injection molding material is injected into the cavity of the injection molding tool, so as to produce a contact housing with integrated electrical contact element.

20 Claims, 2 Drawing Sheets

(56)  References Cited

OTHER PUBLICATIONS

Office Action for DE 102021109460.7 from the German Patent Office (in English—Machine Language Translation).
DE102018133100A1 English language translation, machine translation.

* cited by examiner

METHOD OF MANUFACTURING A CHARGING DEVICE WITH A CONTACT HOUSING OF AN ELECTRICALLY POWERED VEHICLE

CROSS REFERENCE TO RELATED APPLICATIONS

This patent application claims priority to priority document German patent application DE102021109460.7, filed on Apr. 15, 2021, the content of which is herein incorporated by reference.

BACKGROUND OF THE INVENTION

Field of the Invention

The present invention relates to a method of manufacturing a charging device having a contact housing of an electrically powered vehicle.

Description of Related Art

Purely electrically driven motor vehicles or plug-in hybrid vehicles usually have a charging socket to which a charging plug can be connected for electrically charging a battery of the vehicle. The charging sockets comprise a contact housing made of plastic. The contact housing includes a plurality of receiving openings. Electrical contact pins, which are electrically contacted with contact sockets of the charging plug when the battery is charged, are passed through the receiving openings. The contact pins can be clipped, pressed or pressed into the receptacle openings.

DE 10 2018 123 621 describes a contact housing for a charging socket of a motor vehicle, comprising a plug interface with a plurality of receiving openings for receiving respective contact pins of the charging socket, which can be contacted with a charging plug for charging a battery of the motor vehicle, the contact housing being a multi-component injection-molded part, the main body of which is produced from a first component and at least respective sealing regions forming borders of the receiving openings are produced from a second component.

The charging sockets known from the prior art comprise a large number of components and the manufacture of the charging sockets is associated with many complex process steps, such as the manufacture of the contact housing and a subsequent fastening of the contact pins in the contact housing.

BRIEF SUMMARY OF THE INVENTION

One task of the invention is therefore to provide an optimized process for manufacturing a loading device using means that are as simple as possible in terms of design.

One aspect of the invention relates to a method of manufacturing a charging device having a contact housing of an electrically powered vehicle comprising providing at least one electrical contact element comprising a contact region, the electrical contact element being electrically contactable in the contact region with a corresponding contact element; placing the electrical contact element in an injection mold; and closing the injection mold and forming a cavity around the electrical contact element within the injection mold. Subsequently, an injection molding material is injected into the cavity of the injection molding tool, thereby producing the contact housing with integrated electrical contact element.

The charging device can be a charging socket or a charging plug. The charging device is used to charge a high-voltage battery of an electrically powered vehicle. An electrically powered vehicle can be understood to mean a purely electrically powered vehicle or a plug-in hybrid vehicle. The electrical contact element may be a contact pin or a contact socket. The electrical contact element comprises the contact area. In the contact area, the electrical contact element can be electrically contacted with a contact element corresponding thereto. For example, a plurality of contact pins may be arranged as electrical contact elements in the charging socket. A plurality of contact sockets may be arranged as corresponding contact elements in a charging plug. In one embodiment, the electrical contact element may comprise a round or square cross-section. In another embodiment, the electrical contact element may comprise a round cross-section and an angular cross-section. For example, the contact region of the electrical contact element may comprise a round cross-section, while the electrical contact element in the cavity region may comprise a square cross-section. By an electrical contact element it is meant an electrical contact element for electrical power supply or an electrical contact element for communication.

In the process according to the invention, the electrical contact element is provided and inserted into an injection mold. The insertion can be carried out by means of an automated gripper or manually, for example. The injection mold comprises two mold halves. The electrical contact element can be inserted in one of the two mold halves. A plurality of electrical contact elements can be inserted in one of the two mold halves.

The injection mold is then closed. When the injection mold is closed, a cavity is formed by the two mold halves. A contour of the cavity corresponds to the external shape, external dimensions, and surface structure of the contact housing.

Finally, an injection molding material is injected into the cavity of the injection molding tool, thus producing the contact housing with integrated electrical contact element. The injection of the injection molding material takes place under pressure, whereby the pressure is selected depending on the shape and size of the cavity and/or on the type of injection molding material to be injected or on the amount of injection molding material. The injection molding material is in a liquid state during injection. The amount of injection molding material to be injected can be determined before injection, so that not too much injection molding material is injected into the cavity. The injection of the injection molding material simultaneously produces the contact housing, and the contact housing is materially bonded to the electrical contact element in the region of the cavity. In a further embodiment, the contact housing may be positively connected to the electrical contact element in the region of the cavity. In a further embodiment, the contact housing may be positively and non-positively connected to the electrical contact element in the region of the cavity. After cooling of the injection molding material, the injection molding material hardens and changes to a solid state and then forms the contact housing with the electrical contact element. A material-to-material bond is thus formed between the contact housing and the electrical contact element when the injection-molded material cools. In addition, the material-to-material bond ensures a seal between the electrical contact element and the contact housing without the need to arrange additional sealing elements, such as a sealing lip, between the contact housing and the electrical contact element.

Plastics such as polyamide, polybutylene terephthalate, polypropylene or other engineering plastics can be used as the injection molding material. Fillers such as glass fibers, glass beads or talc can be added to the plastics before injection to change the material properties of the injection molding material.

After injection and subsequent curing and cooling of the injection molding material, the injection mold can be opened, and the contact housing can be removed with the integrated electrical contact element.

In one embodiment, injection of the injection molding material comprises simultaneous cooling of the electrical contact element. The contact area of the electrical contact element comprises a silver coating. Injection of the injection molding material generates heat and heats the electrical contact element. To prevent the silver coating from detaching from the electrical contact element, the heat is dissipated from the electrical contact element and thus cooled, which increases process reliability. The mold half into which the electrical contact element is inserted may comprise at least one steel core. The steel core is arranged on the side of the contact area of the electrical contact element. A cooling liquid flows around the steel core by means of a cooling channel arranged in the tool half. The steel core removes heat from the electrical contact element and prevents the silver coating from coming off. In addition, gas cooling cores or copper cores can be introduced into the steel core, which improves the cooling of the electrical contact element. With this cooling, no external cooling devices are required, which have to be connected to the injection mold.

In another embodiment, providing the electrical contact element comprises providing at least one undercut on the electrical contact element in the region of the cavity of the injection mold. The undercut may comprise a plurality of grooves. The undercut increases the surface area of the electrical contact element in the region of the cavity, that is, in the region where the material connection between the electrical contact element and the contact housing is formed. By increasing the surface area, the sealing area between the contact housing and the electrical contact element is increased.

In a further embodiment, providing the electrical contact element comprises providing a support element, wherein the support element is attached to the electrical contact element. The support element may be formed in one piece or in two pieces. The carrier element can be a stamped grid. Electronic components can be attached to the carrier element. The carrier element can be fastened to the contact element by means of latching elements or other fastening elements.

In a further embodiment, attaching the support element to the electrical contact element comprises gating the support element to the electrical contact element. The support element may be molded to the electrical contact element using the same injection molding material that is used to manufacture the contact housing. This eliminates the need for fastening elements for fastening the carrier element to the electrical contact element.

In a further embodiment, the injection molding of the carrier element onto the electrical contact element and the injection of the injection molding material into the cavity of the injection molding tool are performed simultaneously. As a result, process steps can be saved during the process for manufacturing the charging device. In addition, this can produce an improved seal between the electronic components of the carrier element and the contact housing, protecting the electronic components from dirt and splash water. An additional seal, for example between the carrier element and the contact housing, is not necessary.

In one embodiment, at least one temperature sensor is attached to the carrier element. The temperature sensor is attached to the support element, in particular by soldering. During an electrical charging process of the high-voltage battery, very high currents and voltages flow through the electrical contact element. The high currents and voltages cause the electrical contact element to heat up. To prevent damage to the electrical contact element, a temperature is measured at the electrical contact element so that remedial measures can be taken to cool the electrical contact element if a measured critical temperature is exceeded. The temperature is detected by the temperature sensor.

Due to the temperature sensor being mounted on the carrier element, the temperature sensor is arranged very close to the electrical contact element. This means that the temperature of the electrical contact element can be recorded very accurately.

In one embodiment, the molding of the carrier element onto the electrical contact element comprises overmolding of the carrier element with the temperature sensor mounted thereon. By overmolding the carrier element with the temperature sensor attached to it, the temperature sensor is protected from mechanical stresses.

The support element may comprise at least one web, which is not overmolded. The web serves as a connection option of a printed circuit board so that the temperature sensor can be electrically connected to a printed circuit board of the charging device. Other electronic sensors or components may be mounted on the printed circuit board.

In one embodiment, the overmolding of the support element with the temperature sensor attached to it and the injection of the injection molding material into the cavity of the injection molding tool are performed simultaneously.

Another aspect of the invention relates to a charging device with a contact housing for an electrically operated vehicle with at least one electrical contact element, which comprises a contact area, wherein the electrical contact element can be electrically contacted in the contact area with a corresponding contact element and wherein the contact housing is designed in one piece and the electrical contact element is directly integrated. The contact housing is manufactured in one piece by means of an injection molding process. The contact housing is overmolded around the electrical contact element. This means that the contact housing is materially bonded to the electrical contact element. The charging device may be a charging socket or a charging plug. The charging device may comprise a plurality of electrical contact elements. By an electrical contact element it is meant an electrical contact element for electrical power supply or an electrical contact element for communication. The charging device may be used as a charging interface for electrically charging a high-voltage battery of an electrically powered vehicle.

Objects and advantages of the disclosed embodiments may be realized and attained by the elements and combinations set forth in the claims. However, embodiments of the present disclosure are not necessarily required to achieve such, exemplary objects and advantages, and some embodiments may not achieve any of the stated objects and advantages.

BRIEF DESCRIPTION OF THE SEVERAL VIEWS OF THE DRAWINGS

Further advantages, features, and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combinations recited, but also in other combinations on their own, without departing from the original scope or intent of the disclosure.

An advantageous embodiment of the invention is explained below with reference to the accompanying FIGURE. It shows.

The FIGURE is merely a schematic representation and serves only to explain the invention. Identical or similarly acting elements are marked throughout with the same reference signs.

The FIGURE shows a schematic representation of the process for manufacturing a loading device.

Figure 1:
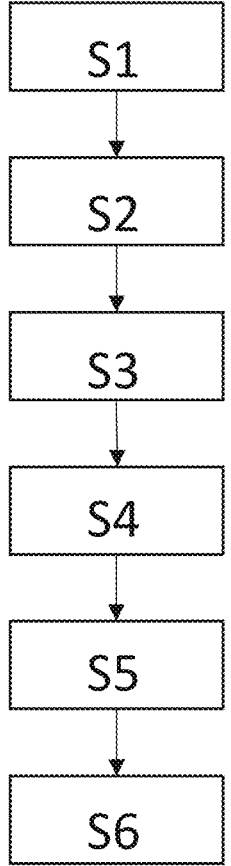
FIG. 1 depicts a schematic representation of the method for manufacturing a loading device.
Figure 2:
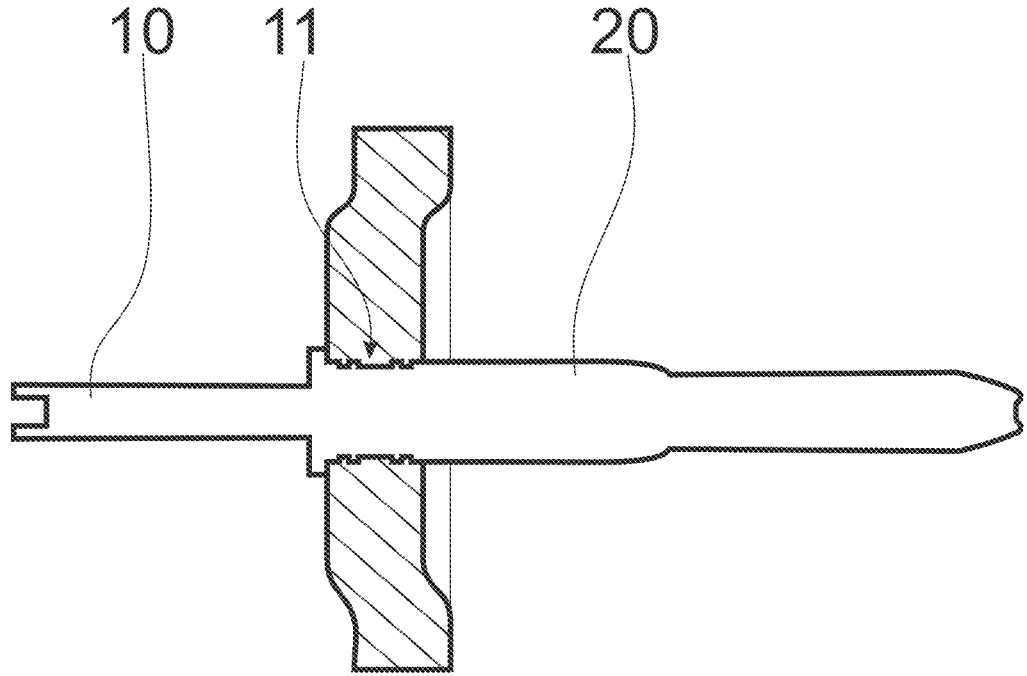

FIG. 2 depicts a schematic exploded or sectional view that illustrates a monolithic housing supporting the instant designed in one piece and a contact element embedded within it supporting the instant directly integrated limitations.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of" "A, B, and C" should be understood as including only one of A, only one of B, only one of C, or any combination of A, B, and C.

In a first step, an electrical contact element is provided. In a first embodiment, the electrical contact element is a contact pin. In a second embodiment, the electrical contact element is a contact socket. The electrical contact element comprises a contact area, whereby electrical contacting of the charging device with a corresponding electrical contact element can be established. In the first embodiment example, the charging device is a charging socket. In the second embodiment, the charging device is a charging plug.

In a second step, a punching grid is provided as a support element (S2). A temperature sensor is soldered onto the stamping grid. The temperature sensor detects a temperature of the electrical contact element during electrical contacting with the corresponding electrical contact element.

The punching grid comprises latching hooks which latch into corresponding notches arranged around the electrical contact element. This secures the punching grid to the electrical contact element in a third step (S3).

The electrical contact element with the stamped grid attached to it is then inserted into a first mold half of an injection mold (S4).

By closing the first mold half with a second mold half (S5) of the injection mold, a cavity is formed in an area of the electrical contact element inside the injection mold around the electrical contact element. The cavity corresponds to the outer dimensions of a contact housing of the charging device.

Subsequently, an injection molding material is injected into the cavity (S6). Injection of the injection molding material produces the contact housing. The contact housing serves to fix the electrical contact element in the charging device and to protect electrical components which can be connected to the electrical contact element within the charging device. At the same time as the contact housing is manufactured, the contact housing is materially connected to the electrical contact element in the area of the cavity. This protects the electrical components arranged inside the charging device and part of the electrical contact element against splash water and dirt. By injecting and simultaneously producing the contact housing, no additional fastening elements are required for fastening the electrical contact element to the contact housing or additional sealing elements.

While the injection molding material is being injected, the contact area of the electrical contact element is cooled simultaneously. This takes place within the first mold half. By means of cooling channels arranged inside the first mold half, a steel core is flushed with water around the contact area.

After the injection molding material has cooled (S7), the contact housing made from the injection molding material with the integrated electrical contact element can finally be removed.

Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

What is claimed is:

1. A method for manufacturing a charging device with a contact housing of an electrically operated vehicle, the method comprising:
    providing at least one electrical contact element comprising a contact area, wherein the electrical contact element is arranged in an electrical connection with a contact element in the contact area;
    inserting the electrical contact element into an injection mold;
    closing the injection mold and forming a cavity around the electrical contact element inside the injection mold;
    injecting an injection molding material into the cavity of the injection molding tool thereby producing the contact housing with an integrated electrical contact element; and
    wherein the step of providing further comprises the step of introducing at least one undercut on the electrical contact element in the region of the cavity of the injection mold.

2. The method according to claim 1, wherein the step of injecting the injection molding material further comprises the step of cooling the electrical contact element.

3. The method according to claim 1, wherein the step of providing further comprises the step of providing a support element attached to the electrical contact element.

4. The method of claim 3, wherein the step of attaching the support member to the electrical contact member further comprises the step of molding the support member to the electrical contact member.

5. The method according to claim 3, wherein the injection of the carrier element onto the electrical contact element and the injection of the injection molding material into the cavity of the injection molding tool are performed simultaneously.

6. The method according to claim 4, wherein the injection of the carrier element onto the electrical contact element and the injection of the injection molding material into the cavity of the injection molding tool are performed simultaneously.

7. The method according to claim 3, wherein at least one temperature sensor is attached to the support element.

8. The method according to claim 4, wherein at least one temperature sensor is attached to the support element.

9. The method according to claim 5, wherein at least one temperature sensor is attached to the support element.

10. The method according to claim 6, wherein at least one temperature sensor is attached to the support element.

11. The method of claim 7, wherein the step of molding the support member to the electrical contact member further comprises the step of overmolding the support member with the temperature sensor mounted thereon.

12. The method of claim 8, wherein the step of molding the support member to the electrical contact member further comprises the step of overmolding the support member with the temperature sensor mounted thereon.

13. The method of claim 9, wherein the step of molding the support member to the electrical contact member further comprises the step of overmolding the support member with the temperature sensor mounted thereon.

14. The method of claim 10, wherein the step of molding the support member to the electrical contact member further comprises the step of overmolding the support member with the temperature sensor mounted thereon.

15. The method according to claim 11, wherein the overmolding of the support element with the temperature sensor attached thereto and the injection of the injection molding material into the cavity of the injection molding tool are performed simultaneously.

16. The method according to claim 12, wherein the overmolding of the support element with the temperature sensor attached thereto and the injection of the injection molding material into the cavity of the injection molding tool are performed simultaneously.

17. The method according to claim 13, wherein the overmolding of the support element with the temperature sensor attached thereto and the injection of the injection molding material into the cavity of the injection molding tool are performed simultaneously.

18. The method according to claim 14, wherein the overmolding of the support element with the temperature sensor attached thereto and the injection of the injection molding material into the cavity of the injection molding tool are performed simultaneously.

19. The method according to claim 1, wherein the under-cut is configured and arranged to increase a surface area of the integrated electrical contact element in an area of the cavity wherein a material connection between the electrical contact element and the contact housing is formed.

20. The method according to claim 1, further comprising a plurality of contact sockets arranged as corresponding contact elements in a charging plug and wherein the electrical contact element comprises a round and/or square cross-section.

* * * * *